B. F. MULLANEY.
GARAGE CONSTRUCTION.
APPLICATION FILED MAR. 30, 1920.

1,420,494.

Patented June 20, 1922.
4 SHEETS—SHEET 4.

Inventor:
Benjamin F. Mullaney
by Roberts Roberts & Cushman,
his Atty's.

UNITED STATES PATENT OFFICE.

BENJAMIN F. MULLANEY, OF BOSTON, MASSACHUSETTS, ASSIGNOR TO JAMES PURDON, OF BOSTON, MASSACHUSETTS, TRUSTEE.

GARAGE CONSTRUCTION.

1,420,494.         Specification of Letters Patent.    Patented June 20, 1922.

Application filed March 30, 1920. Serial No. 369,925.

*To all whom it may concern:*

Be it known that I, BENJAMIN F. MULLANEY, a citizen of United States of America, and resident of Boston, in the county of Suffolk and State of Massachusetts, have invented new and useful Improvements in Garage Construction, of which the following is a specification.

My invention relates to the construction of garages for so-called "live storage" of motor vehicles, in which the arrival or departure of vehicles is irregular, sometimes productive of congestion, and which, as usually operated involve annoying loss of time of the owners of vehicles who are in a hurry either to store them or take them out.

The conditions in single-floor garages are comparatively simple and involve little difficulty. Where, as in congested city districts it is necessary to use several floors of a building for live storage of motor vehicles, elevators have usually been resorted to, and turn tables for the better direction of vehicles to their respective stalls. As the vehicles which have the largest turning radius can turn inside a circle about sixty feet in diameter, but no less, much time is consumed in getting the vehicles into or out of their stalls, and a serious amount of abrasion and damage to the vehicles results from the generally prevailing conditions.

Inclined ways, adapted to the passage of motor vehicles from floor to floor have been used instead of elevators, and it has been proposed to employ two spiral ways, one inside the other, for this purpose, so that motor vehicles in transit either up or down may proceed without having to pass each other; but this, and indeed any arrangement of inclined ways, heretofore contrived, involves the occupation of a large amount of space, which, in the localities where many storied garages have to be used, is very costly.

The main object of any invention is to arrange spiral ways for motor vehicles from floor to floor of a garage in such a manner that space shall be economized, and so that vehicles shall all move in the same direction, whether going up or down. Other objects of my invention will appear from the description which follows.

I do not herein claim the subject matter common to this application and my continuing application Serial No. 436,658, filed January 12, 1921.

In the drawings hereto annexed, which illustrate my invention,

The general plan of a garage comprising my improvements may with advantage be circular, the main body of the building itself therefore cylindrical. The passage for motor vehicles from floor to floor is by means of spiral inclined planes, of such gradient that they can be safely negotiated by any motor vehicle proceeding under its own power, or controlled by its brakes.

The ways, from bottom to top and top to bottom of the tier of storage floors, consist of two spirals each of which, in the special form here shown has its pitch reduced to zero at each floor. These two spirals intersect at each floor, at diametrically opposite points, these points of intersection being where the inclined portion of each spiral way joins the horizontal or floor portion.

The stalls for vehicles on each floor are arranged outside the peripheries of the intersecting spiral ways, and may with advantage be tangential thereto, so that a vehicle may enter or leave its stall with ease and celerity, and with a minimum of reverse movements.

Figure 1:
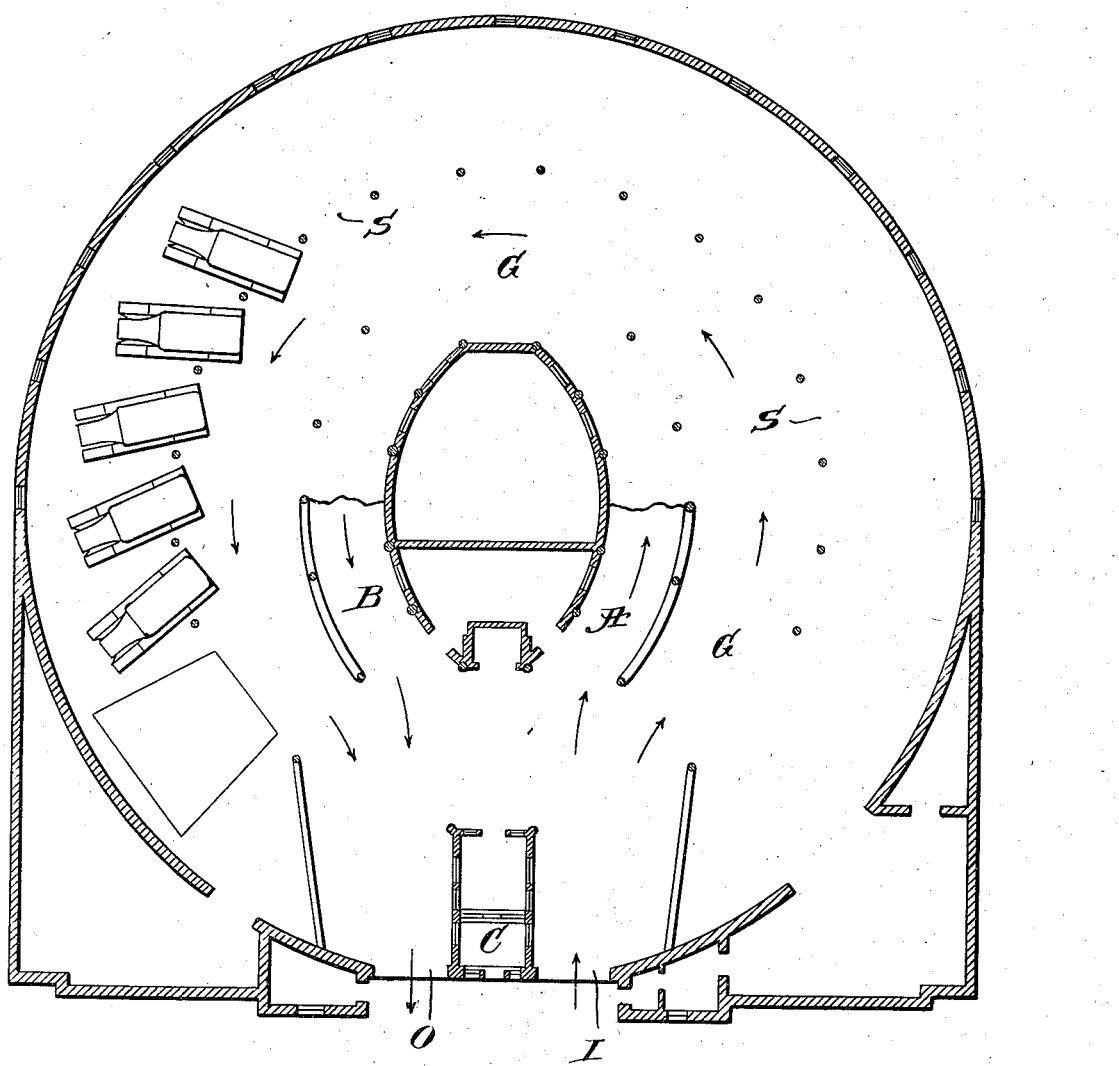
Figure 1 is a ground floor plan of a garage comprising my invention.

The mode of operation of this invention may well be explained by tracing the movements of a motor vehicle entering the garage and afterward leaving it. Referring to Fig. 1: Vehicles go in at the opening I, which is separated from the exit opening O by the checking station space C. The vehicle of which the path is now being traced in imagination first goes around the floor G, in the direction of the arrows, its driver looking for the first empty stall S. If none is found on the ground floor, the car is then driven up the first upward stage of the spiral way A—A', (see Fig. 2) passing from the inclined part A of this way to the horizontal, or floor part A'. If after traversing the entire circuit of this floor (by way of the portion B' opposite the portion A') the driver of the vehicle finds no empty stall, he continues around the portion A' again until he arrives at the next upward stage of the ascending spiral, represented by A, in Fig. 2. Thus he proceeds until he finds an empty stall, S; stores his car, places his movables if he wishes, in the check room space which may be provided in the center of the building as suggested in Fig. 1 and takes the elevator to the street floor.

When the owner of the vehicle takes it out, he goes by elevator to the floor where he left his vehicle, backs it out of its stall, and goes ahead, always in the direction of the arrows until he comes to an inclined section B of the descending spiral way, B—B' and continues on the alternating sections B and B' until he checks out at the checking station C (Fig. 1).

Figure 2:
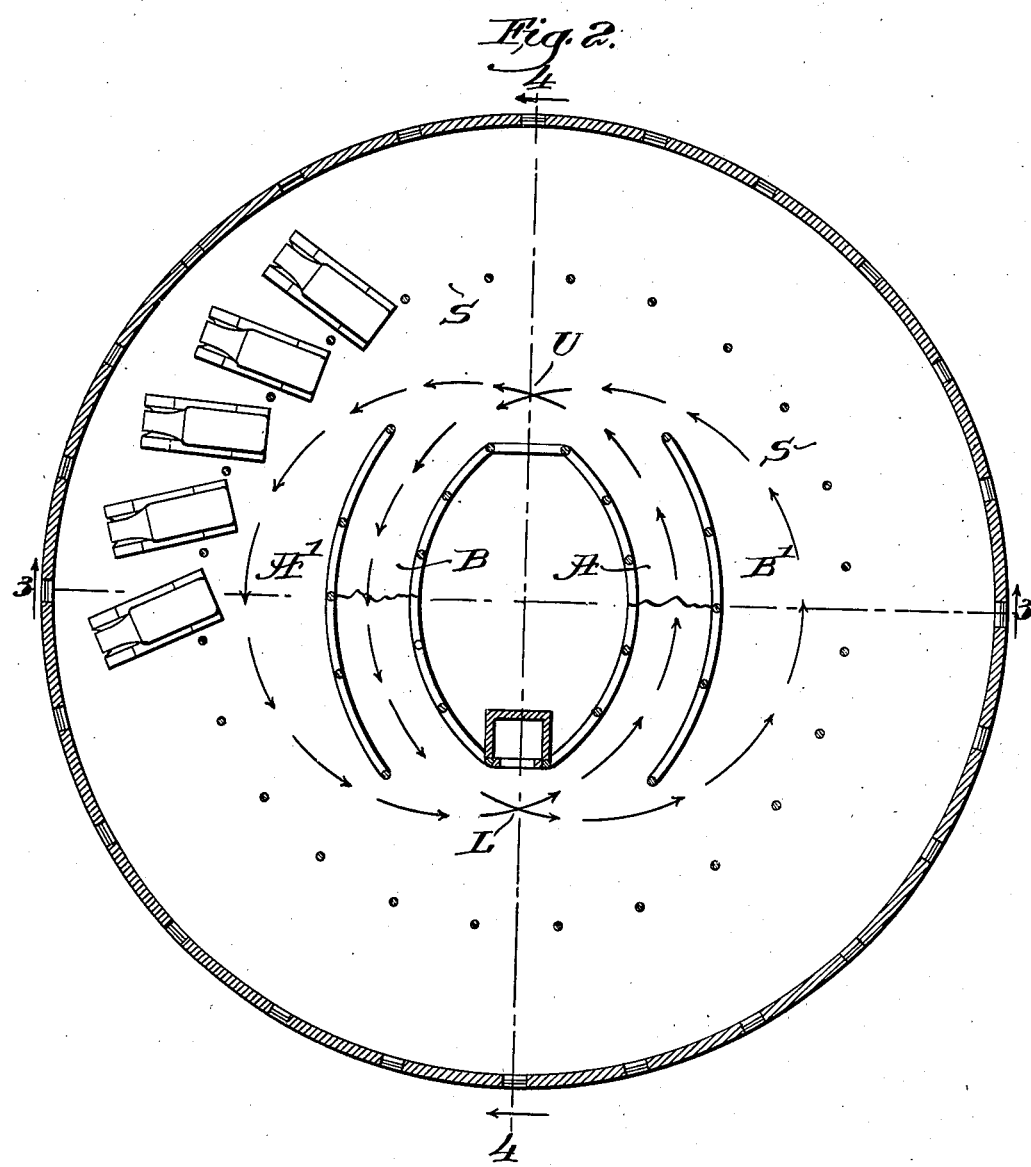
Figure 2 is a typical upper floor plan of the same.
Figure 3:
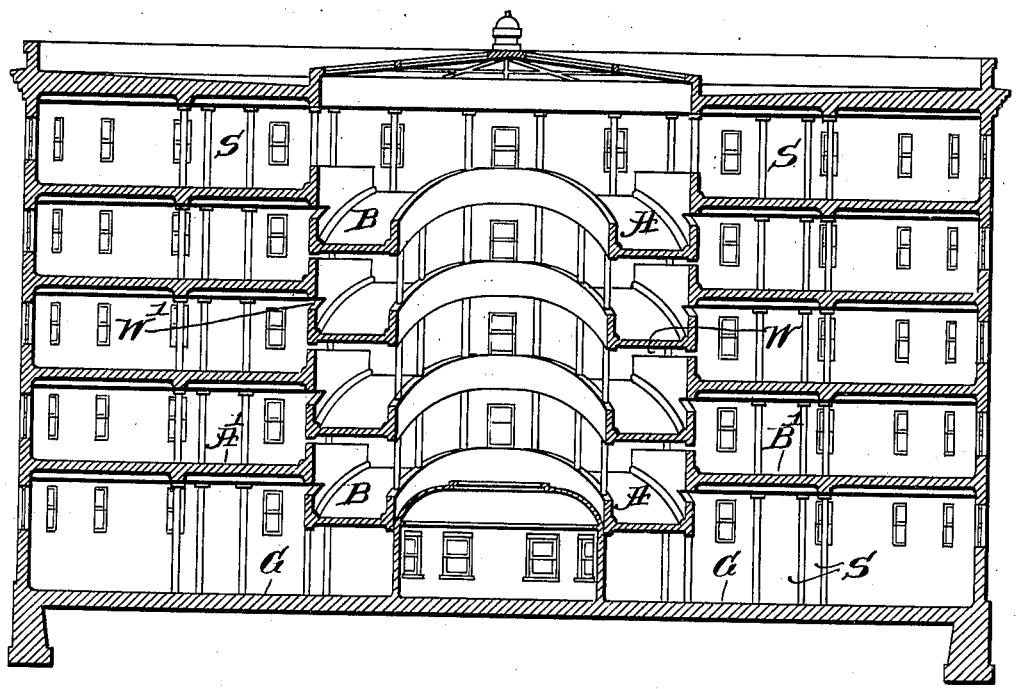
Figure 3 is a vertical section of the garage building, taken at the line 3—3 of Figure 2.
Figure 4:
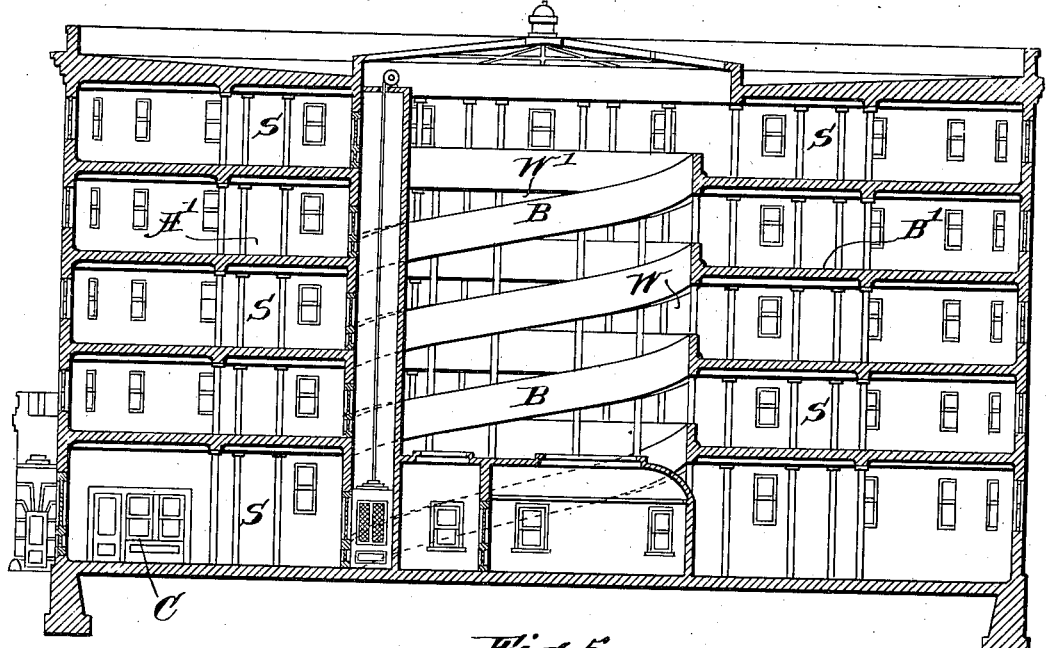
Figure 4 is a vertical section of the garage building, taken at the line 4—4 of Figure 2.

The arrow circles on Fig. 2 show the relationship and arrangement of the two spiral ways A, A' and B, B'. These intersect at L and U on consecutive lower and upper floors, respectively. The sections A' and B' of the two spiral ways coincide in level, and are of zero pitch, so that a vehicle can pass from a section A' to a section B' easily. Whether a vehicle is ascending or descending, its movement of revolution about the vertical axis of the structure is always in one direction,—anti clockwise as viewed from above the garage in the drawings. In order to minimize the liability of collision between vehicles, means for unobstructed vision between the inclined sections and horizontal sections of the two ways are provided. In Figs. 3 and 4, these means are shown to consist of the openings at W and W'. If required these may be glazed.

Figure 5:
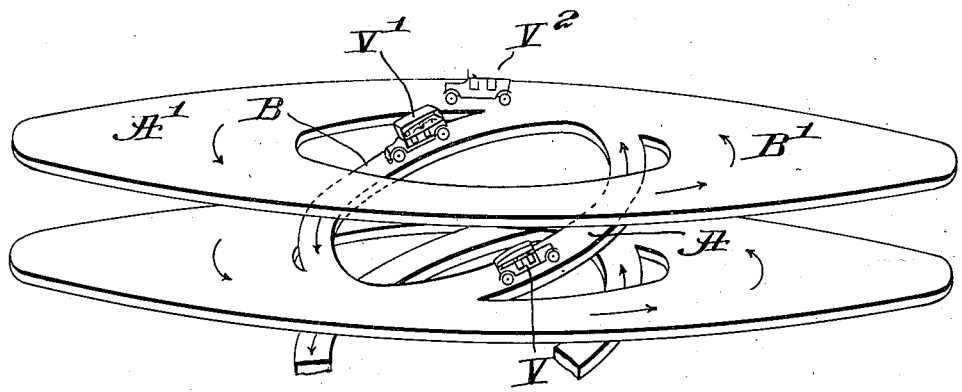
Figure 5 is perspective view (partly broken away) illustrating the principle of my invention.

In Fig. 5, which is a mere diagram showing in perspective the chief elements of my invention, vehicle V is ascending, vehicle V' descending; vehicle V² may be either on its way up or down. But all are proceeding in the same direction of revolution; no matter how many vehicles may be going in or out of the garage at the same time, no two have to pass each other. The only points where a driver of a vehicle will have to watch for another are at the approaches to intersections L and U (Fig. 2) and as there is ample provision for vision from one part of the ways to another, there need be no difficulty at these points.

It will be advisable to have the stalls S, S, arranged tangentially to the peripheries of sections A' and B' so as to facilitate entry and exit from the stalls. In a garage constructed as above described, the only occasion for backing a vehicle is when it is taken from its stall; this will be easy, since the vehicle will have to back hardly more than its own length, and may then go ahead without having to cramp the steering gear.

By arranging the two spiral ways so that they intersect, the unidirectional rotative movement of vehicles both up and down is made possible in a minimum of space.

The fundamental structural principles, exemplified in one form by the arrangement shown in the drawings, will be understood, and their application to specific variants of construction made manifest, by the following analysis of the geometrical relationship of the two intersecting spiral ways. As the locus of a linear spiral is a cylindrically developed surface (best exemplified by a cylinder or cylindroid); so the locus of a spiral which, like each of the spiral ways herein described has a horizontal radial dimension, is an annular space bounded by an inner and an outer cylindrical or cylindroidal surface. The two such annular spaces, which are the loci of the intersecting spiral ways, intersect each other at diametrically opposite points, or rather, regions, so that the outer cylindrical boundary surface of each lies close to the inner cylindrical boundary surface of the other in a segment between the two opposite regions where the annular locus-spaces intersect. The specific example of this fundamental principle of construction, shown in the drawings, is perhaps best illustrated in Fig. 2. If the path of spiral ways A, A' be traced in plan from the part A, through part A' around outside of the plan view of the part B of the other spiral way B, B', to where it rejoins the part A (in plan) and the path of spiral way B, B' be similarly traced in plan from part B, to and through part B' to where it rejoins part B (in plan) the horizontal plan view of the two annular cylindrical or cylindroidal spaces, which are the loci, respectively, of the intersecting spiral ways, will be perceived. Such intersecting, annular, cylindrical or cylindroidal geometric volumes may be represented by taking two similar flat rings, each like a letter O, and laying one on the other, with their centers laterally displaced such a distance that the outer edge of one ring lies close to the inner edge of the other in the segment between the diametrically opposite regions where the two rings cross each other.

Then, if a right handed spiral path or way be developed in one such annular volume, and a similar left handed spiral way be developed in the other, the fundamental principle of construction which embodies this invention will be expressed, provided the planes which represent the successive floors are arranged so that each floor has access to both spiral ways.

By observing and adhering to this structural principle, ways for up and down travel of vehicles from floor to floor, on which vehicles whether going up or down, travel in the same rotary direction can be provided with the least possible sacrifice of space in the building.

I claim:

1. Garage-construction, comprising a series of floors, and two spiral ways adapted to travel of vehicles, each spiral way comprising inclines of suitable pitch from one floor to the next, and portions coincident with the respective floors, lying outside the inclined portions of the other spiral way, one of said spiral ways being a right-handed, the other a left-handed, spiral.

2. Garage construction, comprising a series of floors, and two spiral ways adapted to travel of vehicles, each spiral way comprising inclines of suitable pitch from one floor to the next, and portions coincident with the respective floors lying outside the inclined portions of the other spiral way, each incline subtending an arc of substantially one hundred and eighty degrees of the spiral of which it is a part, one of said spiral ways being a right handed, the other a left handed, spiral.

3. Garage construction, comprising a series of floors, and two spiral ways adapted to travel of motor vehicles from floor to floor, one of said ways a right handed spiral, the other left handed, the two spirals intersecting at diametrically opposite points and coinciding with the floor at opposite sides, respectively, from one point of intersection to the next, and stalls arranged on a floor around the periphery of the spirals.

4. Garage construction, comprising a series of level floors, and two spiral ways adapted to travel of motor vehicles from floor to floor, one of said ways a right handed spiral, the other left handed, each spiral way comprising alternate inclined sections and horizontal sections coincident with floors, the two spirals intersecting at each floor.

Signed by me at Boston, Massachusetts, this twenty-seventh day of March, 1920.

BENJAMIN F. MULLANEY.